UNITED STATES PATENT OFFICE.

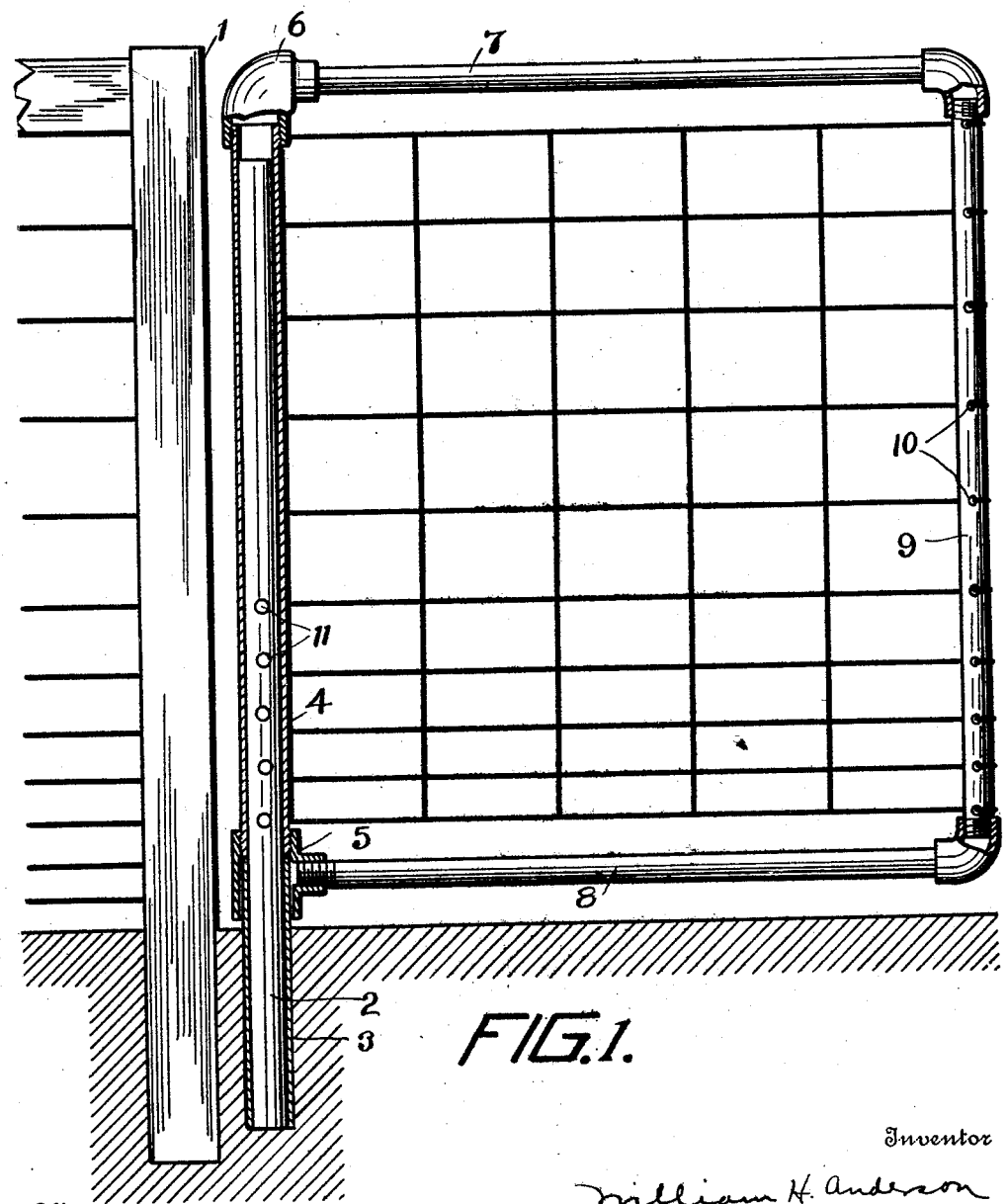

WILLIAM H. ANDERSON, OF BARNARD, NEW YORK.

FARM-GATE.

1,116,867.  Specification of Letters Patent. Patented Nov. 10, 1914.

Application filed March 9, 1914. Serial No. 823,574.

*To all whom it may concern:*

Be it known that I, WILLIAM H. ANDERSON, a citizen of the United States, residing at Barnard, in the county of Monroe and State of New York, have invented certain new and useful Improvements in Farm-Gates, of which the following is a specification.

The object of this invention is to provide a new and improved farm gate. This and other objects of the invention will be fully illustrated in the drawings, described in the specification and pointed out in the claims at the end thereof.

In the drawings, the figure is a side elevation of the gate partly in section.

In the accompanying drawings, like reference numerals indicate like parts.

Reference numeral 1 indicates the end post of the fence, 2 indicates the post of the gate and 3 the tube or pipe which surrounds the post. The tube or socket 3 is set in concrete and the pipe 2 sets loosely in the tube 3. The gate is made with the pipe 4 having a T 5 at the bottom and an elbow 6 at the top. The T 5 is partially threaded to the tube 4 and extends downward and overlaps the tube 3, the lower part of the thread of the T 5 being cut away for this purpose. To the T 5 and elbow 6 are fastened the cross bars 7 and 8 and the upright end bar 9. In the operation of the gate, the pipe 4, T 5, elbow 6 and the bars 7, 8 and 9 will swing together. The pipe 2 is loose in the socket 3 and the gate may swing with and around the pipe 2 or the pipe 2 may turn in the socket 3 or may partly turn in the socket and the gate swing around it the rest of the way or the pipe 2 may be fixed in the socket so that in either case the gate will always swing with the least possible resistance.

The upright 9 is set in the elbows at the top and the bottom with right and left hand thread. Wire netting is fastened around the pipe 4 and the opposite end of it is passed through suitable holes 10 drilled in the pipe 9. The pipe 9 is then turned with a pipe wrench which draws the wire netting tight.

If it is desired to raise the gate so as to avoid snow banks that may accumulate under it, the pipe 2 may be perforated as shown at 11 and the gate may be raised and a pin inserted through the perforation under the T 5 leaving the gate free to swing with the pin forming a temporary bearing therefor.

The end post 1 of the fence and the socket 3 of the gate should preferably be both set in the same block of concrete so that the one will tend to balance the other.

I claim:

1. In a gate the combination of a hollow upright, a T threaded to the bottom of said upright, the lower portion of said T being enlarged, a socket set rigidly in the ground, a pin set in said socket and extending up through said T and said hollow upright, said upright abutting against said socket and a part of the T extending down around said socket.

2. In a gate the combination of a hollow upright, a T threaded to the bottom of said upright, a socket set rigidly in the ground, a pin set in said socket and extending up through said T and said hollow upright, said upright abutting against said socket and a part of the T extending down around said socket.

3. In a gate the combination of a hollow upright to which the gate is attached, a socket set rigidly in the ground under said upright, a pin set in said socket and extending up through said hollow upright, said upright normally abutting against said socket, said pin having perforations extending therethrough above the socket, said perforations being capable of receiving a pin to support said gate at various points above the socket.

In testimony whereof I affix my signature in presence of two witnesses.

WILLIAM H. ANDERSON.

Witnesses:
  ALICE M. JOHANNS,
  EDNA K. BOOTH.

Copies of this patent may be obtained for five cents each, by addressing the "Commissioner of Patents, Washington, D. C."